W. L. CHRISTIAN & P. BARKER.
SHOE FOR TIRES.
APPLICATION FILED DEC. 6, 1915.
1,222,070.
Patented Apr. 10, 1917.
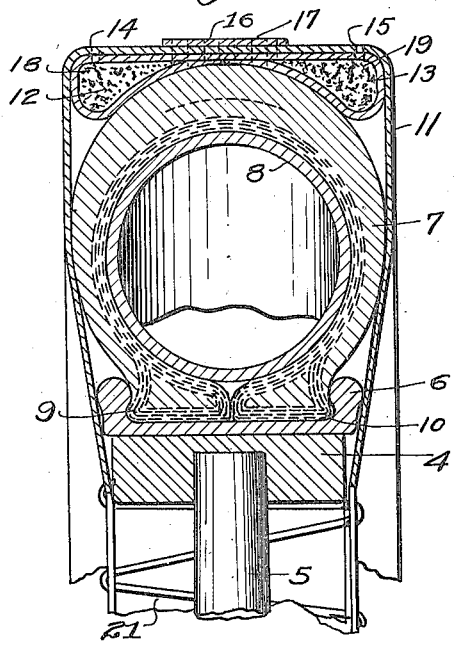
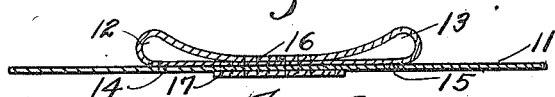
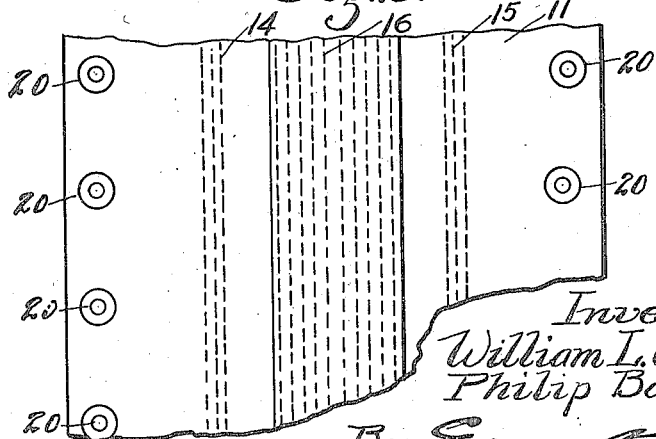
Inventors
William L. Christian
Philip Barker
By Edward A. Stevens
Atty.

UNITED STATES PATENT OFFICE.

WILLIAM L. CHRISTIAN AND PHILIP BARKER, OF LOS ANGELES, CALIFORNIA.

SHOE FOR TIRES.

1,222,070. Specification of Letters Patent. Patented Apr. 10, 1917.

Application filed December 6, 1915. Serial No. 65,267.

*To all whom it may concern:*

Be it known that we, WILLIAM L. CHRISTIAN and PHILIP BARKER, both citizens of the United States, residing at Los Angeles, in the county of Los Angeles and State of California, have invented new and useful Improvements in Shoes for Tires, of which the following is a specification.

This invention relates to a shoe for tires.

It is an object of this invention to provide an attachment for tires which will increase the area of the tread surface.

It is a further object to provide a detachable shoe for tires which is flexible and may be easily attached and detached and can be folded into a compact space.

In the use of tires with motor vehicles upon sandy ground or upon loose soil it is found that the tractive adhesion is so small that the wheels will spin. This is due to the small area of contact between the tire and the ground, the tires being of substantially circular cross section. In order to increase the adhesion we have found it expedient to increase the area of contact and accomplish this by applying a shoe which will give a substantially flat bearing surface.

We have illustrated an embodiment of our invention in the accompanying drawing, in which:

Figure 1 is a section through a tire, and the felly of a wheel showing our improved shoe secured thereto.

Fig. 2 is a plan view of a fragment of a shoe in open position.

Fig. 3 is a sectional view through the shoe ready to fold for storage.

More particularly, 4 indicates the felly of a wheel to which the spokes 5 are connected, and 6 the wheel rim which is herein shown as being of the clencher type. The type of rim or of wheel is not a feature of our invention. A well known type of pneumatic tire is here illustrated, being composed of an outer casing 7 and an inner tube 8. The outer casing is formed with beads 9 and 10 suitable for engagement by the clencher rim 6. Our shoe is adaptable to any type of tire which has a body which in cross section has a rounded crown or tread portion.

The shoe comprises a belt or ply 11, preferably formed of canvas or duck and which is so constructed that it will extend about the periphery of the tire. Secured to the belt which forms one ply are pockets 12 and 13. These may be formed of the same material as the ply 11 and consist of fabric folded upon itself, stitched to the ply 11 as indicated at 14 and 15 and adjacent the center of the ply 11 as indicated at 16. The stitching is so made that a collapsible pocket is formed. To increase the wearing qualities of the tire, and also the strength, a peripheral tread piece 17 is secured to the ply 11 and the stitching 16 made so that it secures the pockets 12 and 13, ply 11 and tread portion 17 to each other. The pockets 12 and 13 have a filling 18 and 19 which may be of sand, rope or any other suitable packing material. We have shown the belt 11 as formed with eyes 20 to receive lacing 21 for the purpose of securing the shoe to the tire. Any other suitable means may be used instead of eyelets and lacing.

To apply the shoe to the tire it is laid peripherally about the tire with the pockets 12 and 13 over-hanging the sides, as indicated in Fig. 1, thereby raising a portion of the ply 11 and forming a bearing surface relatively flat, and of large area. The ends of the belt 11 extend over the sides of the tire and the lacing 21 is inserted through the eyelets 20 engaging the wheel felly, thereby securing the shoe about the tire and holding it firmly in position. When detached from the tire the shoe may be flattened, as shown in Figs. 2 and 3, and folded into a very compact space to be stored away.

Our invention is especially useful in desert country or upon sandy roads. In such places the wheels of a truck or automobile sink in and stall the machine. Our improved shoe offers a greater bearing surface and greater tractive adhesion, thereby overcoming the above mentioned difficulty.

What we claim is:

1. A shoe for tires, comprising a flexible belt adapted to extend peripherally about a tire, said belt formed with a collapsible pocket projecting from one surface and extending longitudinally of the belt, removable filling in said pocket of a character to adjustably conform to tires of different curvatures, said pocket adapted to be disposed against the concave portion of the tire, and means for detachably securing the belt to said tire.

2. A shoe for tires, comprising a flexible belt adapted to extend peripherally about a tire, said belt formed with complementary collapsible pockets projecting from one surface and extending longitudinally of the belt, removable filling in said pockets of a character to adjustably conform to tires of different curvatures, said pockets adapted to be diposed across the concave portion of the tire whereby a flat tread surface is formed, and means for detachably securing the belt to the tire.

3. A shoe for tires, comprising a belt adapted to extend peripherally about a tire, said belt including a ply of flexible material, complementary pockets disposed upon one surface and extending longitudinally of said belt, each pocket formed by folding a strip of flexible material upon itself and securing the latter to said ply, removable filling in said pockets of a character to adjustably conform to tires of different curvatures, said pockets adapted to be disposed against the concave portion of the tire whereby a flat tread surface is formed, and means for detachably securing the belt to the tire.

In witness that we claim the foregoing we have hereunto subscribed our names this 22d day of November, 1915.

WILLIAM L. CHRISTIAN.
PHILIP BARKER.